H. W. DYER.
REVOLVING DOOR.
APPLICATION FILED JUNE 24, 1909.

1,159,367.

Patented Nov. 9, 1915.
6 SHEETS—SHEET 1.

FIG·1·

H. W. DYER.
REVOLVING DOOR.
APPLICATION FILED JUNE 24, 1909.

1,159,367.

Patented Nov. 9, 1915.
6 SHEETS—SHEET 2.

WITNESSES
John M. Canfield
Mary J. Laidlaw

INVENTOR
BY Harry W. Dyer
Delos Holden
his ATTORNEY

H. W. DYER.
REVOLVING DOOR.
APPLICATION FILED JUNE 24, 1909.

1,159,367.

Patented Nov. 9, 1915.
6 SHEETS—SHEET 5.

WITNESSES

INVENTOR
Harry W. Dyer
BY Delos Holden
his ATTORNEY

UNITED STATES PATENT OFFICE.

HARRY W. DYER, OF EAST ORANGE, NEW JERSEY, ASSIGNOR, BY MESNE ASSIGNMENTS, TO VAN KANNEL REVOLVING DOOR COMPANY, OF NEW YORK, N. Y., A CORPORATION OF NEW JERSEY.

REVOLVING DOOR.

1,159,367.  Specification of Letters Patent.  Patented Nov. 9, 1915.

Application filed June 24, 1909. Serial No. 504,156.

*To all whom it may concern:*

Be it known that I, HARRY W. DYER, a citizen of the United States, and a resident of East Orange, in the county of Essex and State of New Jersey, have made certain new and useful Improvements in Revolving Doors, of which the following is a description.

My invention relates to revolving doors and has for its object the provision of novel means for supporting the same whereby its weight is distributed upon a plurality of bearings, said means preferably permitting the radial wings to be set at any desired angle with respect to each other (for instance, at right angles when four wings are used), and held rigidly together by tension members or other suitable means, said supporting means also permitting the wings, whenever desired, to be moved freely with respect to each other, whereby they may occupy planes parallel with each other, thus providing for the folding of the door into the least possible compass. This folding of the door may be accomplished by a very slight pressure against one or more of wings whenever one or more of the tension members is out of its holding position, so that the door will be folded automatically by a rush of persons against the same. By providing means for releasing said tension member either automatically or at will the structure becomes an emergency door particularly suitable for use in theaters and other buildings where large numbers of persons may at times desire to leave through the same doorway with the least possible delay, as in the case of fire or panic. These desirable results are secured in the structure shown by pivoting said wings upon the ends of separate hinge arms, said arms being themselves pivoted concentric with the central axis of the door. The door as a whole is rotatable about said axis and is preferably supported or hung upon a suitable carriage or translating device which permits the door when folded to be moved bodily to one side of the doorway. This carriage may, however, be dispensed with, if desired, without impairing the usefulness of the emergency structure above referred to.

In order that the invention may be more fully understood, reference is made to the accompanying drawing in which—

In all of the above views corresponding parts are designated by the same numerals of reference.

Figure 1:
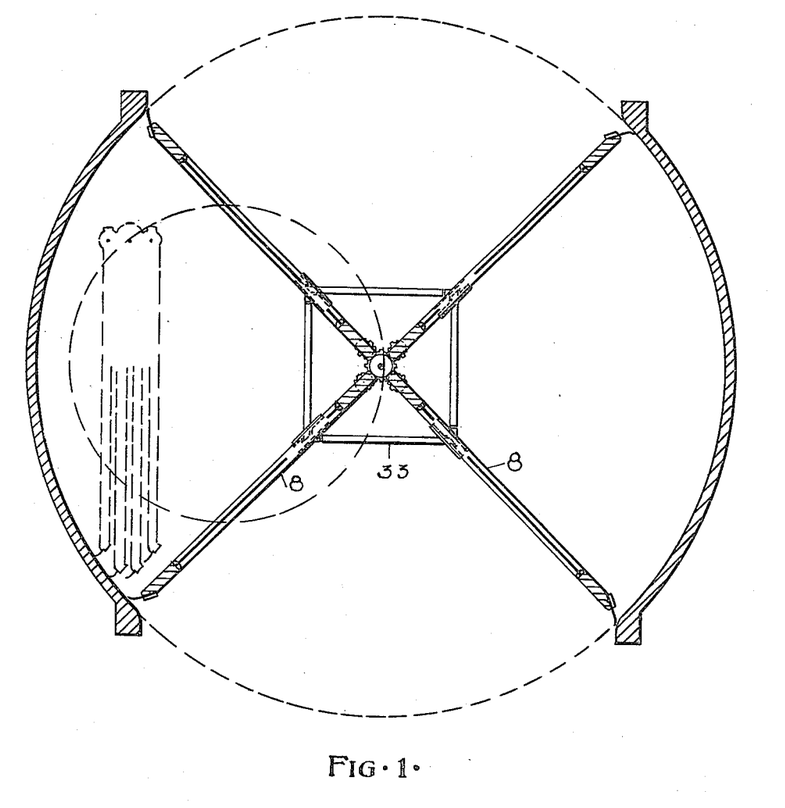
Figure 1 is a horizontal section of the door and doorway in the plane 1—1 of Fig. 21.
Figures 2, 3, 4, 5, 24:
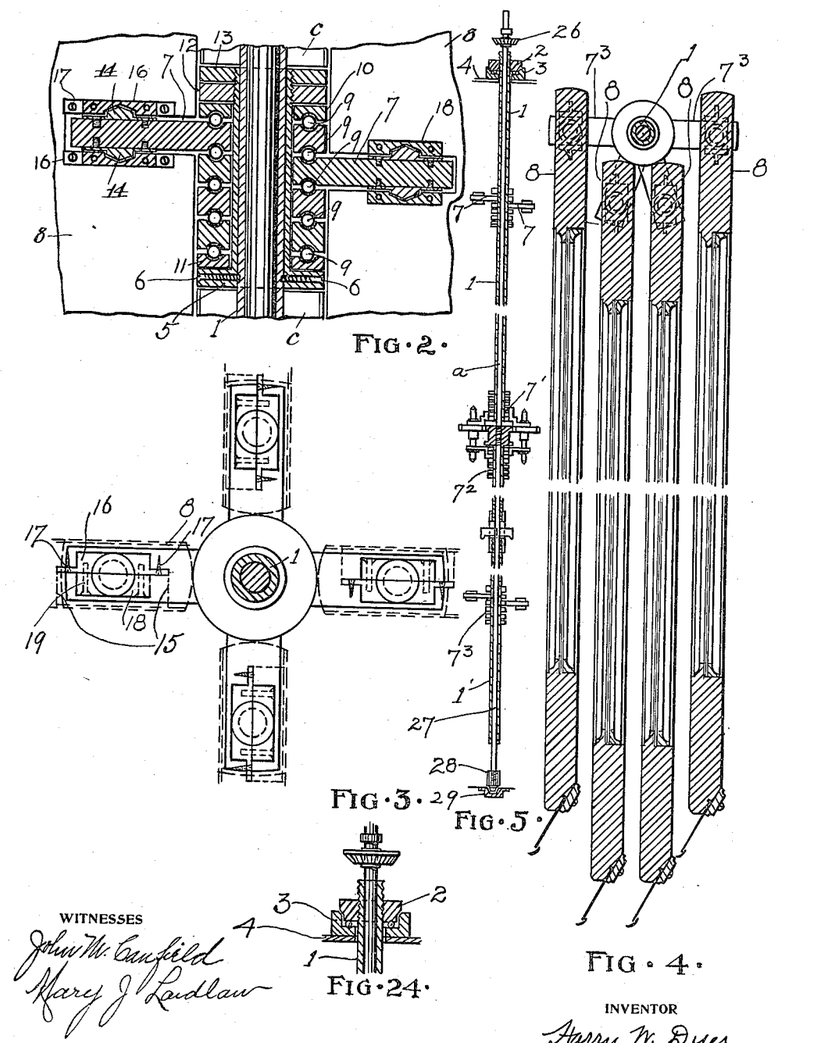
Fig. 2 is a detail vertical section of one of the sets of hinge arms and showing the pivots for supporting the wings of the door.
Fig. 3 is a horizontal section in the plane 3—3 of Fig. 21.
Fig. 4 is a horizontal section in the plane 4—4 of Fig. 21, the wings being folded into parallel planes.
Fig. 5 is a detail side elevation, partly in section, showing the central axis of the door and parts associated therewith.
Fig. 24 is an enlarged detail of a portion of Fig. 5.

The door illustrated in the drawings comprises a central support in the form of a vertical tube 1, the upper end of which is provided with a bearing block 2 which forms a part of the roller bearing 3 carried by the translating device 4, shown as a turn table. A shouldered sleeve 5 is secured to the tube 1 by any suitable means, such as screws 6 (see Fig. 2). Rotatably supported on this sleeve are a number of hinge members constituting the upper set of hinges, each hinge-member comprising a disk having an outwardly extending arm 7 to which is pivoted one of the wings of the door, there being one of said hinge-members for each door wing. Rollers 9 are interposed between the various hinge-members and the upper and lower bearing-members 10 and 11, the whole being held together by a clamping-nut 12 and a jam-nut 13, threaded on the sleeve 5, thereby forming a series of roller-bearings for the support of the hinge-members.

Upon the outer end of each of the arms 7 is pivotally mounted one of the door wings 8. Any form of bearing for carrying the wing may be used, that shown being constructed as follows: Metal pivot blocks 14 are secured to the upper and lower surfaces of the arms 7 or may be integral therewith. The wing 8 is recessed as shown at 15 (Fig. 3) and the metal bearing block 16 is embedded therein and secured by screws 17. The other block 18 is then secured to the block 16 by screws 19 to complete the bearing. There is a set of hinge members having arms 7' similar to the arms 7, and supported similarly by a shouldered sleeve 5' secured to the lower end of the tube 1 (see Fig. 6), rollers being interposed between the various parts and the whole secured by a clamping nut and jam nut as before described.

Each of the arms 7' near its outer extremity carries a vertical rotatable pivot rod or pin 20 having a collar 21 rigid therewith and by which it is supported. The lower ends of said rods are also provided with rigid collars 22 which support arms $7^2$ which are similar to the arms 7', and are similarly mounted, as shown, upon a shouldered sleeve $5^2$ which is secured to the upper end of a vertical tube 1' which is in axial alinement with the tube 1, rollers being interposed between the various parts and the whole clamped together as before. The wings 8 are hung upon the ends of the rods 20 in exactly the same way as upon the pivot blocks 14 previously described. Near the lower end of the tube 1' is secured a shouldered sleeve which supports a set of hinge members havings arms $7^3$ (see Fig. 5) in the same way that the arms 7 are supported, and the wings 8 are hung upon the ends thereof in the same way as upon the arms 7. By the means employed in pivoting the wings to the several sets of hinge-members, it will be seen that the wings are adapted to swing either upon the hinge-members or upon their pivotal connections with said members, so that the door as a whole may rotate about its central axis, or the wings be swung upon their pivots, independently of the hinges, and be folded side by side.

Figures 18, 19, 20, 21, 22, 23:
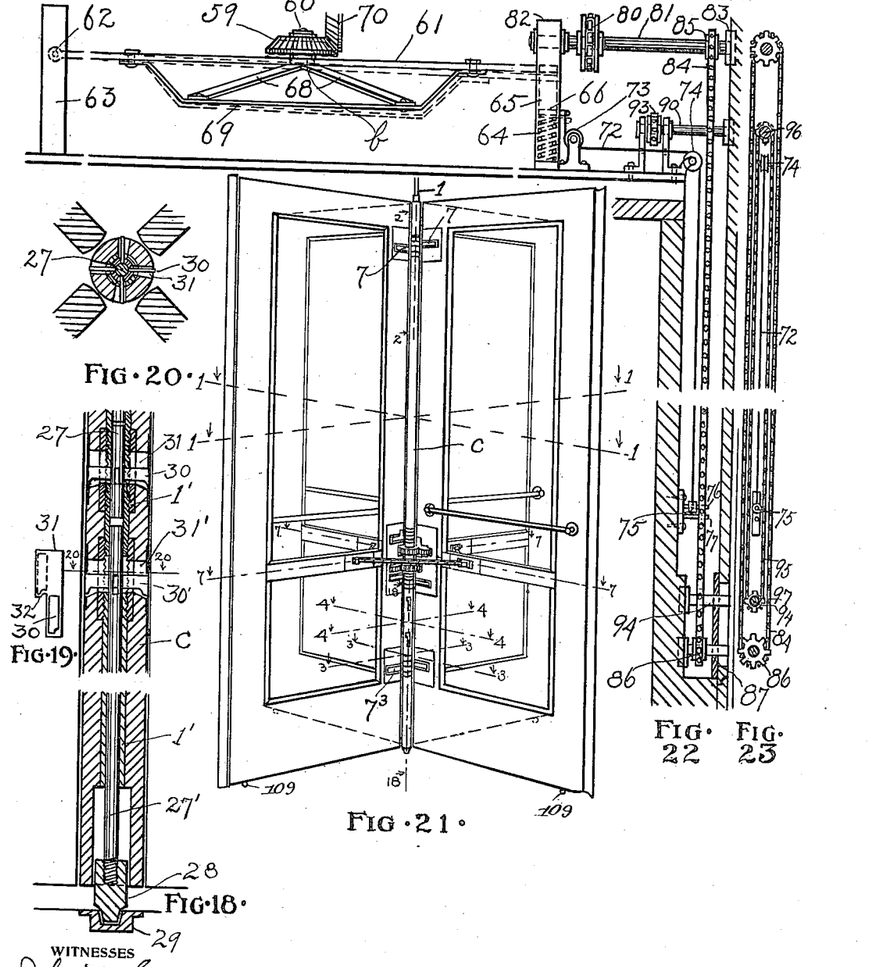
Fig. 18 is a vertical section in the plane 18—18 of Fig. 21.
Fig. 19 is a detail of the means for operating one of the central rods of the door.
Fig. 20 is a section on line 20—20 of Fig. 18.
Fig. 21 is a perspective view of the door with the wings in normal or operative position.
Fig. 22 is a section on line 22—22 of Fig. 16.
Fig. 23 is a section on line 23—23 of Fig. 16.

A central rod $a$, composed of upper and lower sections 23 and 24 united by a block or casting 25, is loose within the tubes 1 and 1' and extends beyond the tube 1 at its upper end. Below the rod just described and in axial alinement therewith is a rod 27 which is loose within the tube 1'. The rod 27 is provided with a plurality of handles 30, preferably four in number, and which occupy slots 31 formed in the tube 1' and filler $c$. These handles are useful for raising the rod 27 to thereby elevate the rod $a$ for a purpose which will be later referred to. The slots 31 are formed with shoulders 32 upon which the handles 30 are adapted to rest to support the rods 27 and $a$ in their elevated position. There is another rod 27' below the rod 27, the lower end of which is provided with a shoe 28 adapted to engage a socket 29 in the floor for holding the door in its central position. The rod 27' is also provided with handles 30' adapted to rest upon shoulders formed in the tube 1' to sustain the said rod in an elevated position when one desires to shift the door to one side of the doorway. In practice a filler $c$ of wood or other suitable material will inclose the tubes 1 and 1' as shown in Figs. 6, 18 and 21.

I shall now describe the mechanism which has to do with the collapsing of the door. This collapsing will be effected by a movement of the hinge arms and wings 8 whenever the tension members 33 which hold the wings in normal positions are released. Each of these members is a flexible cable secured at one end of the wings and normally held at the other end to the adjacent wing by a latch which may be operated to release the tension member in any one of the following ways: First, by an abnormal pressure against one of the wings or a portion thereof; second, by a direct manipulation; and third, by rotation of the central rod $a$ when in its lower position.

Figure 6:
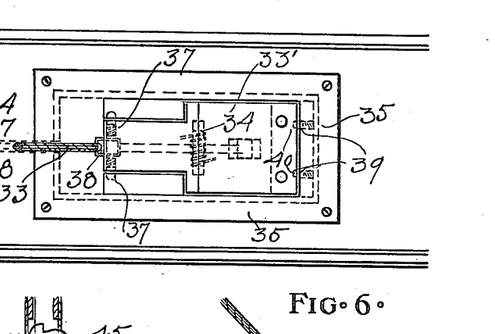
Fig. 6 is a detail vertical section on line 6—6 of Fig. 7.
Figures 7, 8, 9, 10:
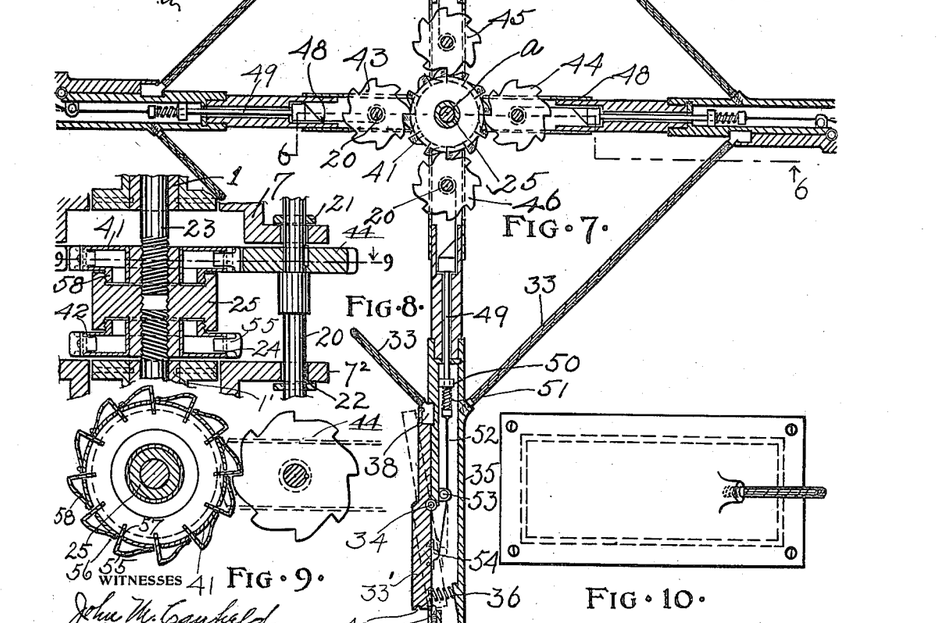
Fig. 7 is a horizontal section in the plane 7—7 of Fig. 21.
Fig. 8 is an enlarged detail of a portion of Fig. 6.
Fig. 9 is a section on line 9—9 of Fig. 8.
Fig. 10 is a face view of a plate for securing one end of one of the tension members.

Two forms of latch for locking the tension members are shown, the preferred form in Figs. 6 and 7 and a modification in Figs. 11 to 15.

In the first form there is a plate 33' hinged at 34 to a frame 35 set into the wing 8. This plate normally occupies the position shown in full lines, Fig. 7, being held in such position by an outwardly pressing spring 36, and a pair of spring bolts 37 (Fig. 6) set into said plate and engaging sockets in the frame 35.

There is a lug 38 on the end of the cable 33 which normally occupies recesses in the frame 35 and plate 33' as shown, and is held thereby during the ordinary operation of the door. Upon the application of abnormal pressure however against the wing 8, the spring bolts 37 yield, allowing the plate 33' to turn on the hinge 34 into the position shown in dotted lines, Fig. 7, thereby releasing the lug 38. The free end of the cable 33 then drops and the wings are then free to be folded like the leaves of a book into the positions shown in Fig. 4, whereby the doorway is unobstructed. This folding or collapsing of the wings can be accomplished by the release of any one of the tension members 33. It is not necessary to release more than one, although all of them may be released if desired. Furthermore, abnormal pressure against either face of the wing will produce the same result, as is evident from the arrangement of parts shown in Fig. 7.

In order to release the tension member 33 by hand it is necessary only to press upon the plate 33' near the end farthest from the center of the door with sufficient force to cause the yielding of the spring bolts 37. The plate is then moved into the position shown in dotted lines, Fig. 7, where it is locked by spring bolts 39 which are mounted on the frame 35 in position to engage sockets 40 in the end of the plate 33'. The weight of the lug 38 and cable 33 is sufficient to cause the same to drop as soon as the plate 33' is moved sufficiently to disengage the lug.

In order that the tension members 33 may be released by rotation of the central rod it is necessary only to lower the same by one of the handles 30 into the position shown in Figs. 6 and 8. There are a pair of gears 41 and 42 rigidly secured to the block 25. The upper gear 41 is adapted to engage gears 43 and 44 rigid with the spindles or pins 20 upon which two of the wings 8 are hinged, and the lower gear 42 will engage gears 45 and 46 rigid with the pins 20 upon which the other two wings are hinged. Each of the spindles 20 is formed with an enlarged drum portion 47 upon which will be wound a flexible steel ribbon 48 as the spindle is caused to rotate. The inner end of the ribbon is of course secured to the spindle, and the other end is secured to one end of a rod 49 adapted to slide in a bearing 50, and normally pressed outward by a spring 51. There is a flexible wire 52 secured to the other end of the rod 49, and said wire passes over a sheave 53 mounted on the frame 35 and is secured to a plate 54 which is rigid with the plate 33'. Obviously, as the rod $a$ rotates, the gears 41 and 42 will cause the gears 43, 44, 45 and 46 to rotate which will rotate the four spindles 20 and wind up the ribbons 48 thereby pulling on the wires 52 through the slidable rods 49 and turning the plate 33' on its hinge 34 to release the lug 38 as previously described.

The gears 41, 42, 43, 44, 45 and 46 may be ordinary spur gears if desired, but I prefer to form them as shown in order to facilitate the engagement of the central or master gears 41 and 42 with the others as the rod $a$ is lowered. Each of the gears 41 and 42 comprises a hollow body 58 as shown the hub of which is externally threaded for engagement with an internal thread in the block 25 and upon the periphery are riveted a set of spring teeth 55. The rivets 56 secure one end of each spring, and the other end is bent inward as shown and inserted through a slot 57 formed in the periphery of the body 58. The springs 55 are therefore yieldable in a radial direction, and will be pressed inward by the teeth of the gears on the spindles 20 whenever the gears are not in proper relative positions for engagement as the gears 41 and 42 are lowered with the rod $a$. Said spring teeth 55 will, however, cause the said gears to readily find their proper operating positions. The outer surfaces of the spring teeth are rounded as shown in Fig. 8 whereby they may be the more readily pressed inward by the teeth of the coöperating gears.

The mechanism for rotating the rod $a$ comprises the bevel gear 26 mounted thereon and a similar gear 59 rotatable on a stud 60 carried by a movable frame $b$. This frame consists of a beam 61 pivoted at one end at the point 62 (Fig. 22), to the upright 63, and supported at its opposite end by a compression spring 64 which rests upon the base of the upright 65 and bears against a foot 66 depending from the beam. There is an arm 67 extending transversely from the center of the beam to the extremity of which the said stud 60 is secured. The arm 67 and beam 61 are stiffened by truss members 68 and 69. The spring 64 tends to hold the movable frame in the position shown in full lines, Fig. 22, whereby the bevel gear 59 is held in engagement with a bevel gear 70 mounted on a shaft 71. The gear 59 may be lowered out of engagement with said gear 70 by a pivotal movement of the said frame into the position shown in dotted lines. This movement is effected by means of a wire 72 secured at one end to the foot 66 of the beam 61 and passing thence over sheaves 73 and 74 mounted on the door casing. The lower end of the wire 72 is provided with a ring 75 adapted to be slipped over either of the pins 76 or 77 to hold the frame in either of its positions against the pressure of the spring 64, whereby the gear 59 may be brought out of driven relation to the gear 70. The latter is mounted on the drive shaft 71 which is rotatable in bearings 78 on the door casing. A sprocket 79 is mounted on one end of said shaft and a chain 79' passes around the same and around a sprocket 80 mounted on the shaft 81. This latter shaft rotates in fixed bearings 82 and 83 and is driven by a chain 84 passing around a sprocket 85 on the shaft 81 and a sprocket 86 mounted on a shaft 87 supported in fixed bearings and having a squared end accessible to the exterior of the door casing for receiving a crank for rotating the same. The central rod $a$ of the door may therefore be rotated from said shaft 87 when the movable frame $b$ is in its upper position through the sprocket 86, chain 84 sprocket 85, shaft 81, sprocket 80, chain 79', sprocket 79, shaft 71 and bevel gears 70, 59 and 26.

The turn table 4 may be rotated whenever desired by means of a gear 88 mounted on a shaft 89 and adapted to be driven from a shaft 90 through a chain 91 and sprockets 92 and 93. The shaft 90 is driven from a shaft 94 having a squared end through a chain 95 and sprockets 96 and 97. The rotation of the turn table is of course for the purpose of carrying the door to one side of the doorway as I have explained in a previous patent. Before attempting to rotate the turntable one should first fold the wings by releasing the tension members 33 and moving the wings into parallel planes as in Fig. 4, and then raise the bottom rod 27' to disengage the shoe 28 from the socket 29. With the wings in folded position their center of gravity is at a considerable distance from the axis of the door which tends to swing the same out of a vertical position. For this reason I provide each wing with a ball caster 109 adapted to rest on the floor and relieve the center support of the strain which would otherwise be put upon it.

Referring now to the modified structure for holding and releasing the tension members, and shown in Figs. 12 to 15, there is a slidable spring pressed rod 98 to the inner end of which the ribbon 48 is secured. The outer end of the said rod is formed with an ear 99 having a handle 100. This ear extends through a slot 101 formed in a plate 102 which is secured to the wing 8. A spring 103 is riveted at 104 to the lower wall of said slot and supports the said ear. The outer edge of the ear is formed with a sloping shoulder 105 and the lug 106 which is secured to the end of the cable 33 has a groove 107 adapted to receive the edge of the ear 99, and said groove has a sloping wall 108 adapted to press against the shoulder by an outward movement of said lug to depress the ear. In such case the ear moves downward in an arc concentric with the center of the rod 98 and against the pressure of the spring 103 until the surface 108 of the lug 106 clears the shoulder 105, whereupon the lug which holds the tension member is released. Such movement is produced by an abnormal pressure against any one of the wings 8, the angle of the surfaces 105 and 108 being such as to hold the lug firmly under ordinary conditions of use of the door.

Figures 11, 13, 14, 15:
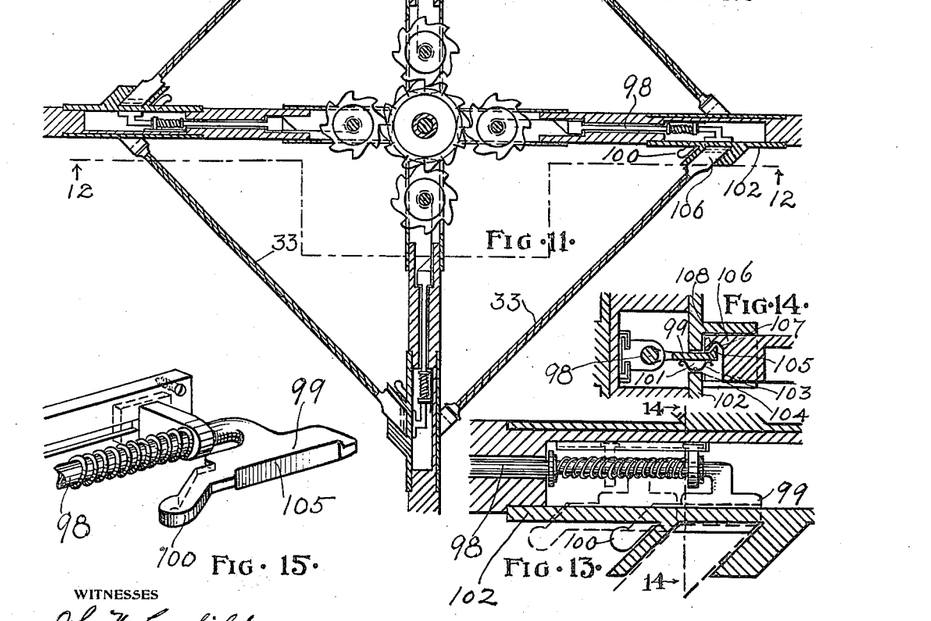
Fig. 11 is a view similar to Fig. 7 and showing a modified structure.
Fig. 13 is an enlarged detail of a portion of Fig. 11.
Fig. 14 is a section on line 14—14 of Fig. 13.
Fig. 15 is a perspective view of a detail of Fig. 13.
Figure 12:
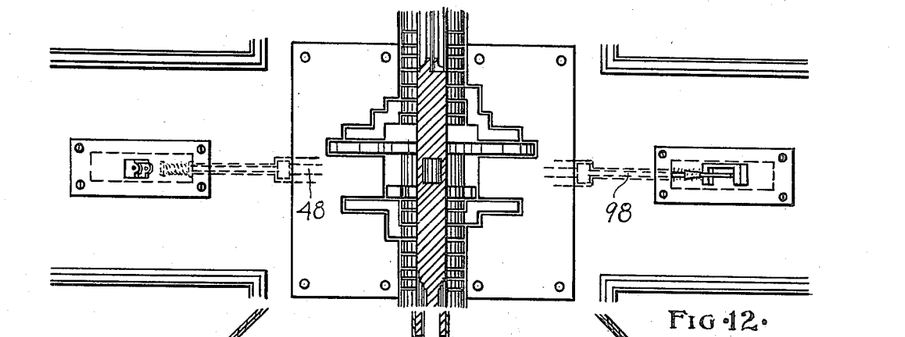
Fig. 12 is a section on line 12—12 of Fig. 11.
Figure 16:
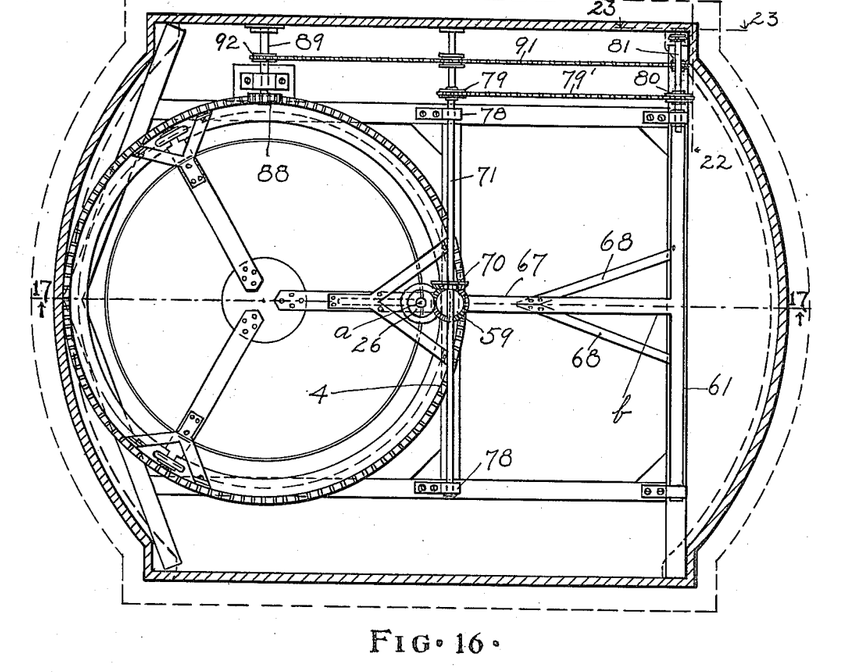
Fig. 16 is a plan view of the door supporting and translating mechanism, together with associated parts, the inclosing casing being in section.
Figure 17:
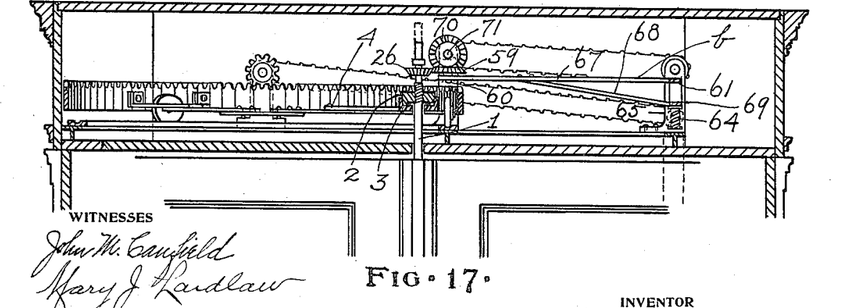
Fig. 17 is a section on line 17—17 of Fig. 16.

The lug 106 may be readily released at any time by moving the handle 100 of the ear 99 from the position shown in full lines in Fig. 13 to that shown in dotted lines. It may also obviously be released by a rotation of the central rod $a$ of the door, in the manner previously described.

Having now described my invention, what I claim is:

1. A revolving door comprising a central support and a plurality of wings extending outwardly therefrom each of said wings being movable independently of the others about two vertical axes, one of which is common to all the wings, substantially as set forth.

2. A revolving door comprising a central support and a plurality of wings extending outwardly therefrom, each of said wings being movable independently of the others about a fixed central axis common to all and about an eccentric axis not common to any other wing, substantially as set forth.

3. A revolving door comprising a central support and a plurality of wings extending outwardly therefrom, each of said wings being movable independently of the others about a fixed central axis common to all and about an eccentric axis not common to any other wing, and means for holding said wings angularly spaced around said central support and in fixed relation to each other, substantially as set forth.

4. In a revolving door, a central support and a plurality of hinge members carried thereby and movable independently of each other about a common axis, and a wing pivoted on each of said hinge members at a point removed from said common axis, substantially as set forth.

5. A revolving-door, comprising a central support carrying a plurality of outwardly-extending arms, said arms being mounted one above the other between roller-bearings, and a wing hinged to each arm.

6. In a revolving door, a central support, a plurality of arms mounted thereon one above another and separated by rollers whereby each arm may be rotated independently of the others, and a wing hinged to each of said arms, substantially as set forth.

7. In a revolving door, a central support and a plurality of outwardly extending wings capable of independent movement, means for holding said wings in fixed relation, and means within the central support for releasing said holding means, substantially as set forth.

8. In a revolving door, a central support and a plurality of outwardly extending wings capable of independent movement, means for holding said wings in fixed relation, and means within the central support for simultaneously releasing said holding means at a plurality of points, substantially as set forth.

9. In a revolving door, a central support and a plurality of outwardly extending wings capable of independent movement, means for holding said wings in fixed relation, a vertical shaft within the central support for simultaneously releasing said holding means at a plurality of points and means for operating said shaft, substantially as set forth.

10. In a revolving door, a central support and a plurality of outwardly extending wings capable of independent movement, means for holding said wings in fixed relation, a vertical shaft within the central support, a gear mounted thereon, a gear engaging the same and means connected to said second gear for releasing said holding means, substantially as set forth.

11. In a revolving door, a central support and a plurality of outwardly extending wings capable of independent movement, means for holding said wings in fixed relation, a vertical shaft within the central support, a gear mounted thereon, a gear engaging the same and means connected to said second gear for releasing said holding means and comprising a drum, a flexible tension member wound thereon and a slidable bolt, substantially as set forth.

12. In a revolving door, a central support and a plurality of outwardly extending wings capable of independent movement, means for holding said wings in fixed relation, a vertical shaft within the central support, a gear mounted thereon, a gear engaging the same and means connected to said second gear for releasing said holding means and comprising a drum, a flexible tension member wound thereon and a slidable spring pressed bolt, substantially as set forth.

13. In a revolving door, a central support and a plurality of outwardly extending wings capable of independent movement, means for holding said wings in fixed relation, a vertical shaft within the central support, a gear mounted thereon, a gear engaging the same, said shaft being vertically movable to disengage the gears, and means connected to said second gear for releasing said holding means, substantially as set forth.

14. In a revolving door, a central support and a plurality of outwardly extending wings capable of independent movement, means for holding said wings in fixed relation, a vertical shaft within the central support, a spring toothed gear mounted thereon, a gear engaging the same, said shaft being vertically movable to disengage the gears, and means connected to said second gear for releasing said holding means, substantially as set forth.

15. In a revolving door, a central support and a plurality of outwardly extending arms capable of independent movement, wings pivoted to said arms, means for holding said wings in fixed relation, comprising a tension member having a locking lug at one end and a flat plate hinged intermediate its ends to one of said wings for engaging said lug, substantially as set forth.

16. In a revolving door, a central support and a plurality of outwardly extending arms capable of independent movement, wings pivoted to said arms means for holding said wings in fixed relation, comprising a tension member having a locking lug at one end, a flat plate pivoted intermediate its ends to one of said wings for engaging said lug, and one or more spring bolts for normally holding said plate in its locking position, substantially as set forth.

17. In a revolving door, a central support and a plurality of outwardly extending wings capable of independent movement, means for holding said wings in fixed relation, means for releasing said holding means, and means situated away from the door for operating said releasing means, substantially as set forth.

18. In a revolving door, a central support and a plurality of outwardly extending wings capable of independent movement, means for holding said wings in fixed relation, means for releasing said holding means, and means extending beyond the vertical limits of the door for operating said releasing means, substantially as set forth.

19. In a revolving door, a central support and a plurality of outwardly extending wings capable of independent movement, means for holding said wings in fixed relation, means for releasing said holding means, and means situated beyond the lateral limits of the door for operating said releasing means, substantially as set forth.

20. A revolving door comprising a central tube, hinge arms rotatably supported thereby, wings mounted on said hinge arms, a central rod and lifting members applied to said rod and extending through openings in said tube and being situated entirely within the path of movement of said wings, substantially as set forth.

21. In a revolving door, a central support and a plurality of outwardly extending wings movable into parallel planes, means for holding said wings in fixed relation means applied to one or more of said wings for releasing said holding means, said means being capable of being operated directly by hand and means situated beyond the space occupied by the path of movement of the door for also operating said releasing means, substantially as set forth.

22. In a revolving door, a central support and a plurality of outwardly extending wings movable into parallel planes, means for holding said wings in fixed relation and means applied to one or more of said wings for releasing said holding means, said means being capable of being operated by direct hand pressure in a direction substantially perpendicular to the plane of the wing and indirectly by abnormal pressure applied to one or more of the wings, substantially as set forth.

23. In a revolving door, a central support and a plurality of outwardly extending wings movable into parallel planes, means for holding said wings in fixed relation means applied to one or more of said wings for releasing said holding means, said releasing means being capable of being operated by abnormal pressure upon one of the wings, and means situated beyond the space occupied by the path of movement of the door for also operating said releasing means, substantially as set forth.

24. A revolving door having in combination, an axial supporting-member, a plurality of leaves or wings, leaf supporting devices comprising a plurality of rotatable collars mounted to turn about said axial supporting member and each having an arm extending radially outward, and hinge connections between said arms and said leaves.

25. A revolving door having in combination, an axial supporting-member, collars arranged, one above the other, to swing around said supporting-member, said collars being provided with radially-extending, leaf supporting-arms, leaves hinged to said supporting arms, and devices for normally holding said leaves in fixed radial position.

26. A revolving-door having in combination, a central support carrying a plurality of outwardly-extending wings capable of independent movement, a vertical shaft within the central support, a yielding tooth gear mounted thereon, and a gear engaging the same, said shaft being vertically-movable to disengage the gears.

This specification signed and witnessed this 23rd day of June, 1909.

HARRY W. DYER.

Witnesses:
 DELOS HOLDEN,
 J. G. TRUSDELL MOORE.